Patented Feb. 9, 1932

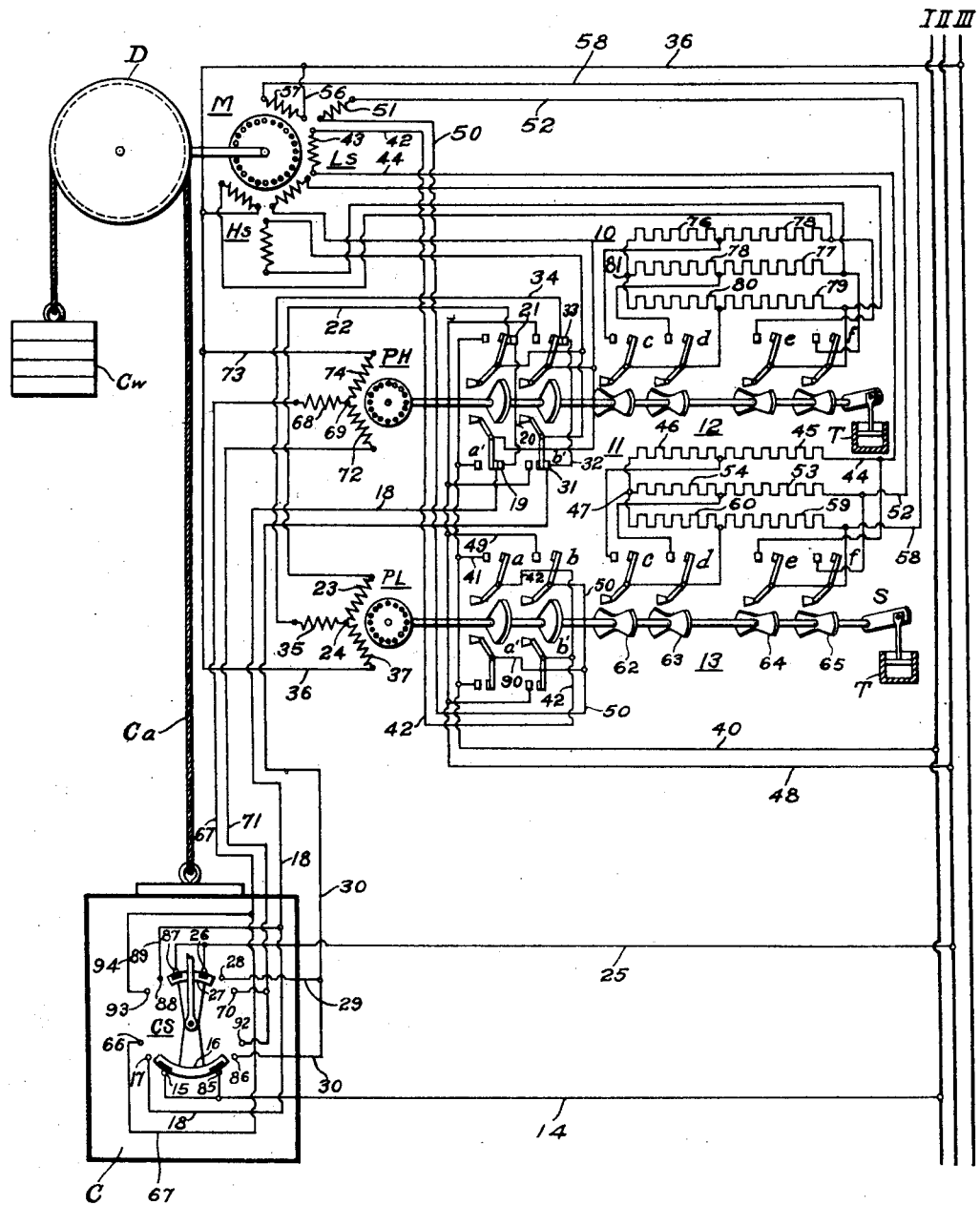

1,844,534

UNITED STATES PATENT OFFICE

HAROLD W. WILLIAMS, OF WILKINSBURG, PENNSYLVANIA, ASSIGNOR TO WESTINGHOUSE ELECTRIC & MANUFACTURING COMPANY, A CORPORATION OF PENNSYLVANIA

ELEVATOR CONTROL SYSTEM

Original application filed March 27, 1928, Serial No. 265,003. Divided and this application filed June 18, 1929, Serial No. 371,837. Renewed March 16, 1931.

My invention relates to motor control systems and it has particular relation to control systems for elevators, hoists and similar machinery.

This application is a division of my application, Serial No. 265,003, filed March 27, 1928.

One object of my invention is to provide a control system for elevators wherein the control of the direction and speed of the elevator will be actuated in a positive manner.

Another object of my invention is to provide a control system for alternating current elevators wherein direction-and-speed-controlling devices will be positively actuated independently of fluctuations of current in the supply circuit.

Another object of my invention is to provide a control system for alternating current elevators wherein a single switching device may be used to control the connection of the motor to the supply circuit and also to control the acceleration of the motor.

It is also an object of my invention to provide a control system for two-speed alternating current motors wherein the direction and speed of the motor with either winding in use, may be controlled by a single switch for each of the windings.

My invention may be described with reference to the accompanying drawing, wherein The sole figure is a diagrammatic view illustrating my invention as applied to a control system embodying a two-speed alternating current motor.

The drawing illustrates an elevator car C as suitably suspended upon a cable Ca that passes over a hoisting drum D to a suitable counterweight Cw. A hoisting motor M is illustrated as being directly coupled to the hoisting drum D, although it is to be understood that suitable gearing may be interposed between the motor and the drum.

The motor M is of the squirrel-cage type provided with two speed windings on the stator, the high speed winding being designated by the character HS and the low speed winding by the character LS. The two speed-windings of the motor are arranged in the usual manner wherein the respective windings determine the number of poles in the stator of the motor to obtain the several speeds. The ratio of the number of poles to each other may be of any desired value, preferably 3 to 1; that is, the high speed winding will contain, for example, 8 poles, while the low speed winding will be used to obtain 24 poles.

A suitable source of power is indicated by supply conductors I, II, III. The stator windings HS and LS are each star-connected to suitable resistor groups 10 and 11, respectively, the resistors of which may be short-circuited by means of a pair of switching devices 12 and 13 that are actuated by pilot motors PH and PL, respectively.

A suitable car switch CS is mounted in the elevator car C and connected to the pilot motors PL and PH in such manner that the pilot motors may be operated in either direction and reversed, as desired. The movement of the pilot motors in one direction is utilized for determining the phase rotation of the respective windings to thereby determine the direction in which the motor M is to operate, and the movement of the pilot motors in the opposite direction is utilized for reversing the phase rotation of the windings to cause the motor M to operate in the opposite direction.

My system may be understood best with reference to an assumed operation of the elevator.

Assuming the elevator car to be in such position in its hatchway as will permit an upward movement thereof, then the car switch may be moved in a clockwise direction to complete circuits for energizing the pilot motor PL to move it in a counter-clockwise direction and cause the car to start upwardly. The completed circuits for the motor PL extend from supply conductor I, through conductor 14, the contact members 15, 16 and 17 of car switch CS, conductor 18, the contact members 19 on the switching device 12, conductor 20, the contact members 21, conductor 22, and phase winding 23 of the pilot motor PL to a star-point 24; from supply conductor II through conductor 25, the contact members 26, 27 and 28 of car switch CS, conductors 29 and 30, contact members 31, conductor 32, contact members 33, conductor 34, and the phase winding 35 of the pilot motor PL to the start point 24; and from supply conductor III through conductor 36 and phase winding 37 of the pilot motor PL to the star point 24.

The completion of the circuits for the pilot motor PL causes that motor to move in a counter-clockwise direction, thereby closing the contact members $a$ and $b$, of the switching device 13 to supply current to the low speed windings LS by way of circuits which extend from line conductor I through conductors 40 and 41, the contact members $a$ of switching device 13, conductor 42, the phase winding 43 of the low speed winding LS, conductor 44 and the resistor sections 45 and 46 to a star point 47; from supply conductor II, through conductors 48 and 49, the contact members $b$ of switching device 13, conductor 50, the phase winding 51 of low speed winding LS, conductor 52 and resistor sections 53 and 54 to the star point 47; and from supply conductor III, through conductors 36 and 56, the phase winding 57 of low speed winding LS, conductor 58 and resistor sections 59 and 60 to the star point 47. The motor M will, therefore, start and accelerate in one direction on the low speed winding connection.

As the pilot motor PL continues to rotate, it operates and closes its contact members $c$ and $d$ by means of cam members 62 and 63, respectively. It is assumed that the dimensions and arrangements of the cams 62 and 63 and the retarding effect of dash pot T are such that a predetermined time elapses between the closing of the contact members $a$ and $b$, and $c$ and $d$. Hence, at a predetermined time after current is supplied to the low speed winding LS, the resistor sections 46, 54 and 60 will be shunted by the contact members $c$ and $d$ thus supplying increased voltage to the winding LS. The motor will thereupon accelerate to the speed determined by the value of the voltage so supplied.

At a predetermined time thereafter, the contact members $e$ and $f$ of the switching device 13 will be operated to a closed position by cam members 64 and 65, respectively, (also arranged to engage and operate the respective contact members $e$ and $f$ at a predetermined time after actuation of the contact members $c$ and $d$,) and resistor sections 45, 53 and 59 will be excluded from the low-speed-winding circuits and the motor will accelerate to substantially its synchronous speed for this winding.

Assuming now that the car switch CS is moved further in the clockwise direction, then the pilot motor PH will be energized to operate the switching device 12 for supplying current to the high speed winding HS. The circuits completed for the pilot motor PH extend from the supply conductor I through the conductor 14, the contact members 15, 16 and 66 of the car switch CS, conductor 67, and the phase winding 68 of the pilot motor PH to a star point 69; from supply conductor II to conductor 25, the contact members 26, 27 and 70, conductor 71, and phase winding 72 of the pilot motor PH to the star point 69; and from supply conductor III through conductors 36 and 73, and phase winding 74 of the pilot motor PH to the star point 69. The energization of the pilot motor PH causes it to rotate in a counter-clockwise direction, thereby closing its contact members $a$ and $b$ for supplying current to the high speed winding HS.

It will be observed that the circuits completed by the pilot motor PL for the low speed winding extend in series relation through normally closed contact members 21 and 33 on the switches $a$—$b$ and $a'$—$b'$ associated with the switching device 12. Hence, the actuation of the pilot motor PH to energize the high speed winding HS causes de-energization of the pilot motor PL to thereby disconnect the low speed winding LS during such times as the high speed winding is in circuit.

The circuits for the high speed winding HS are similar to those described for the low speed winding LS except that the phases of this winding are connected in circuit with resistor sections 75—76, 77—78, and 79—80 which terminate in a common star-point 81. As the pilot motor PH continues to operate retarded by dash pot T', its contact members $c$—$d$ and $e$—$f$ are successively actuated to short-circuit the resistor sections 76—78—80 and 75—77—79 to supply increased voltages to the high speed winding HS and thereby cause the hoisting motor M to accelerate to substantially synchronous speed for the high speed winding.

Assuming that it is now desired to stop the elevator car, the car switch CS is moved to its slow speed position; that is, to such position as breaks the engagement between the contact members 16 and 66, as well as 27 and 28, thus de-energizing the windings of the pilot motor PH and permitting the switching device 12 to return to its off or illustrated position.

When the car switch reaches its slow speed position, its contact members 15, 16 and 17 as well as 26, 27 and 28 are re-engaged to energize the pilot motor PL for re-connecting the low speed winding LS to the source of power. As the motor PL continues to rotate, its contact members c—d and e—f are progressively closed to shunt the resistor sections 46—54—60 and 45—53—59. Inasmuch as the motor M is operating above the synchronous speed for the low speed winding LS, a dynamic braking effect is produced to assist in slowing down the car.

When the motor speed has been reduced to substantially synchronous speed of the low speed winding LS, the car switch CS may be moved to its illustrated "off" position, thus deenergizing the pilot motor PL and thereby causing it to move to its neutral or inoperative illustrated position. As the pilot motor PL returns to its neutral position, it opens its contact members a and b thereby opening the circuits for the low speed winding LS and causing the motor M to come to a stop.

Assuming now that it is desired to move the car downwardly, then the car switch CS is moved in a counter-clockwise direction to complete circuits for supplying current with reversed phases to the pilot motor PL to cause it to operate in a clockwise direction and thus supply current with reversed phases to the motor M for moving the car downwardly. The completed circuits for the pilot motor PL extend from supply conductor I through conductor 14, contact members 85, 16 and 86 of car switch CS, conductor 30, the contact members 31 of switching device 12, conductor 32, the contact members 33, conductor 34 and phase winding 35 of the pilot motor PL to the star-point 24; from supply conductor II through conductor 25, contact members 87, 27 and 88 of car switch CS, conductors 89 and 18, contact members 19 of switching device 12, conductor 20, contact members 21, conductor 22 and phase winding 23 of pilot motor PL to the star-point 24; and from supply conductor III through conductor 36 and phase winding 37 of pilot motor PL to the star-point 24.

As the motor PL rotates in a clockwise direction, it closes its contact members a' and b', thereby completing circuits for supplying reversed phases of current to the low speed winding LS, which circuits extend from supply conductor I through conductor 40, the contact members a' of switching device 13, conductors 90 and 50, the phase winding 51 of winding LS, conductor 52, and the resistor sections 53 and 54 to the star-point 47; from supply conductor II through conductor 48, the contact members b' of switching device 13, conductor 42, the phase winding 43 of winding LS, conductor 44 and resistor sections 45 and 46 to the star-point 47; and from supply conductor III through conductors 36 and 56, the phase winding 57 of winding LS, conductor 58 and resistor sections 59 and 60 to the star-point 47. The motor M will thereupon start and accelerate in a reverse direction on the low speed winding connection to move the car downwardly.

As the pilot motor PL continues to rotate in the clockwise direction, it actuates and closes its contact members c and d by means of the cam members 62 and 63, respectively, thereby shunting the resistor sections 46, 54 and 60 to supply increased voltage to the winding LS. The motor will thereupon accelerate to the speed determined by the value of the voltage so supplied.

Upon further rotation of the motor PL, the cam members 64 and 65 close the contact members e and f of the switching device 13, thereby shunting the resistor sections 45, 53 and 59 and causing the motor M to accelerate to substantially its synchronous speed for this winding.

It will be observed that the cam members 62, 63, 64 and 65 are duplicated on opposite sides of the shafts S driven by the motor PL, hence the switches c—d and e—f will be operated regardless of the direction in which the pilot motor rotates.

Assuming further that it is desired to continue the downward movement of the car at a higher speed, then the car switch CS is moved to a greater extent in the counter-clockwise direction to complete circuits for energizing the pilot motor PH to supply current to the high speed winding HS.

The completed circuits for the pilot motor PH extend from supply conductor I through conductor 14, the contact members 85, 16 and 92, of car switch CS, conductor 71, the phase winding 72 of pilot motor PH to the star-point 69; from supply conductor II through conductor 25, the contact members 87, 27 and 93 of car switch CS, conductors 94 and 67 and the phase winding 68 of motor PH to the star-point 69; and from supply conductor III through conductors 36 and 73 and phase winding 74 of motor PH to the star-point 69. The energization of the pilot motor PH causes it to rotate in a clockwise direction, thereby closing its contact members a' and b' for supplying current to the high speed windings HS.

The circuits for the high speed winding HS are similar to those described for the low speed winding LS, except that the phases for this winding are connected in circuit with the resistor sections 75—76, 77—78 and 79—80, which terminate in the star-point 81. As the pilot motor PH continues to operate in its clockwise direction, its contact members c—d and e—f will be successively actuated to shunt the resistor sections 76—78—80 and 75—77—79 to supply increased voltage to the high speed winding HS and cause the hoisting motor M to accelerate to substantially synchronous speed for the high speed winding.

To stop the elevator car C, the car switch CS may be moved to the low speed position, causing a reconnection of the low speed winding, and then to the off-position, precisely in the manner described in connection with the upward operation of the car.

It will be observed that I have provided a control system for alternating current motors provided with high-speed and low-speed windings, wherein the direction and speed of the motor with either winding in use may be controlled by a single switch for each of the windings.

The illustrated and described embodiment of my invention is illustrative only and my system is susceptible to many changes and modes of operation. I therefore, do not desire to be limited to any of the details shown and described except as defined in the appended claims.

I claim as my invention:

1. In a motor-control system, a multi-speed alternating-current motor having a primary winding for each speed, a source of power, accelerating means for said motor including voltage-modifying means in circuit with each of said windings, a switching device for each winding operable in one direction to connect the associated winding to said source to move said motor in one direction and operable in the opposite direction to connect said winding to said source to move said motor in the opposite direction and operable in either direction for excluding the voltage-modifying means from the circuit.

2. In a motor-control system, a multi-speed alternating-current motor having a primary winding for each speed, a source of power, accelerating means for said motor including voltage-modifying means in circuit with each of said windings, a switching device for each winding operable in one direction to connect the associated winding to said source to move said motor in one direction and operable in the opposite direction to connect said winding to said source to move said motor in the opposite direction and operable in either direction for excluding the voltage-modifying means from the circuit and reversible rotating-magnetic-field magnet means for selectively actuating said switching device in the corresponding direction.

3. In a motor-control system, a multi-speed alternating-current motor having a primary winding for each speed, a source of power, accelerating means for said motor including voltage-modifying means in circuit with each of said windings, a switching device for each winding operable in one direction to connect the associated winding to said source to move said motor in one direction and operable in the opposite direction to connect said winding to said source to move said motor in the opposite direction and operable in either direction for excluding the voltage-modifying means from the circuit and reversible rotating-magnetic-field-magnet means for selectively actuating said switching device in the corresponding direction and means for selectively controlling the actuation of said rotating-magnetic-field-magnet means.

In testimony whereof, I have hereunto subscribed my name this 15th day of June, 1929.

HAROLD W. WILLIAMS.